June 29, 1926. 1,590,186
J. F. FANSELOW
DEVICE FOR MAKING TAP CONNECTIONS TO WATER MAINS
Filed July 28, 1924
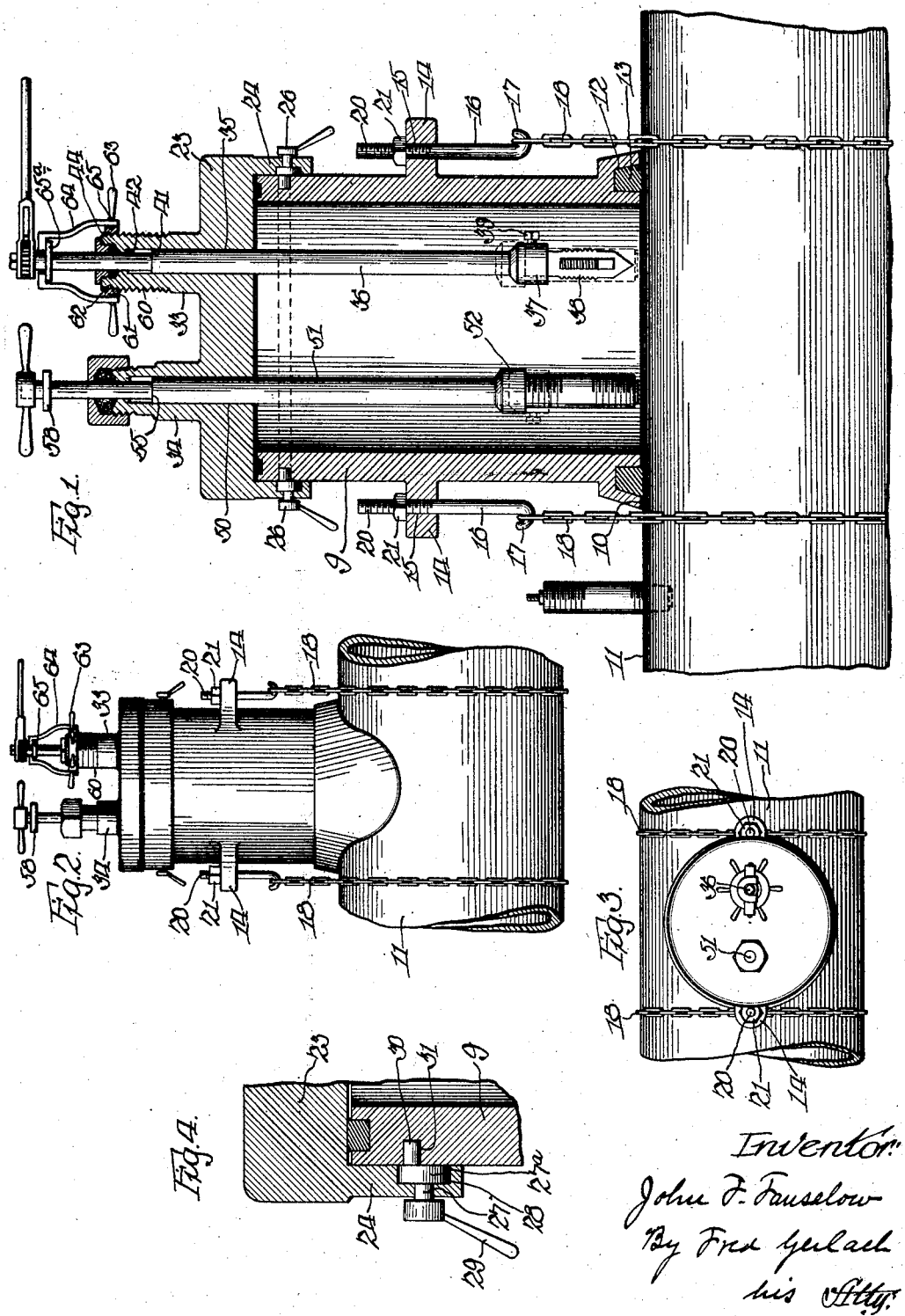

Patented June 29, 1926.

1,590,186

UNITED STATES PATENT OFFICE.

JOHN F. FANSELOW, OF CHICAGO, ILLINOIS.

DEVICE FOR MAKING TAP CONNECTIONS TO WATER MAINS.

Application filed July 28, 1924. Serial No. 728,575.

The invention relates to devices for drilling and tapping water mains and the like and for securing bolts in the holes made therein so that tap connections may be secured to the main.

In practice, it is necessary in many instances to make tap connections to water mains while the main is in use or filled with water. In installing these connections, it is necessary to form tapped holes in the water main for the bolts by which the tap fitting will be secured thereto.

One object of the present invention is to provide a device for drilling and tapping holes and which is adapted for connection to a water main or the like and operative thereon without turning off the water supply therein or permitting the water to escape. Another object of the invention is to provide a device which can be easily manipulated and is adapted to expedite the labor required in making tap connections. Other objects will appear from the specification.

The invention consists in the several novel features hereinafter set forth and more particularly defined by claims at the conclusion hereof.

In the drawings: Fig. 1 is a vertical section of the invention applied to a water main. Fig. 2 is a front elevation of the invention. Fig. 3 is a plan view. Fig. 4 is a detail section of the cam which holds the cap and casing in fluid-tight connection.

In applying tap connections, in accordance with Letters Patent No. 1,317,870, granted to me, October 7, 1919 and using the attaching bolts as set forth in application No. 530,628, filed by me, January 19, 1922, it is necessary to drill and tap holes in the water main for the attaching bolts or devices which secure the fitting of the tap connection to the main. The present invention is illustrated in connection with a device for drilling and tapping the holes in the main and securing the threaded attaching bolts or sleeves therein preparatory to securing the fitting thereon.

The invention is exemplified in a device comprising a cylindrical hollow casing 9 which is provided at its inner end with a curved surface, as at 10, to substantially conform to the curvature of a water main 11. A groove 12 is formed in the curved face 10 of the casing and contains a gasket 13 made of lead or any other suitable ductile material which is adapted to form a fluid-tight connection between the end of casing 9 and main 11. A pair of lugs 14 are integrally formed with casing 9 and are disposed diametrically opposite each other in the axial plane of main 11, and each is provided with an opening 15 through which the shank of a bolt 16 is adapted to pass. The lower end of each bolt 16 is provided with a hook portion 17 on which the ends of flexible chains 18 are secured respectively. These chains are adapted to extend circumferentially around main 11 so as to position and hold the casing securely against the main when the device is in use. The shank of each bolt is provided with a screw-threaded portion 20 adapted to be engaged on the end projecting through the lugs by a nut 21. By rotating nuts 21 with a suitable tool, the tension on chains 18 may be regulated so as to position and hold the end of casing 9 in fluid-tight connection with the main and to fixedly secure it thereon.

The outer end of casing 9 is open and is adapted to be closed by a rotatable cap 23 which is provided with an inwardly extending annular flange 24 adapted to snugly engage the outer periphery of casing 9. When is use, a fluid-tight connection is maintained by the inner face of cap 23 and the outer end of casing 9 by means of devices 26. Each of said devices (as shown in Fig. 4) comprises a stud 27 with a cylindrical portion 27ª adapted to rotate in a bearing 28 in flange 24. The outer end of each stud extends through the flange and is provided with a handle 29 by which the stud 27 may be manually rotated. The inner end of stud 27 is provided with a pin 30 eccentrically mounted on portion 27ª and which extends into an annular groove 31 on the outside of casing 9. By rotating the handle 29, the cap 23 may be forced into and held in fluid-tight connection with the end of casing 9 or it may be released sufficiently to permit the cap to be rotated.

The outer end of cap 23 is provided with a pair of elongated bosses 33 and 34 disposed diametrically opposite each other and at an equal distance from the axis of the casing and the cap. A hole 35 extends through cap 23 and boss 33, in which is journalled a shaft 36 which extends longitudinally of the casing. This shaft, at its inner end, is provided with a chuck or socket 37 in which is held a combined drill and tap 38 for drilling and tapping main 11. A set screw 39 secures the drill in the socket. The outer end of shaft 36 is formed with a shoulder 41 which is adapted to engage a coacting shoulder or constricted portion 42 to prevent the shaft from being pulled out of the cap. A packing box 44 around shaft 36 prevents leakage of water from casing 9 when it is filled with fluid from the main after a hole has been drilled therein. The upper end of shaft 36 is suitably formed for application thereto with a socket or ratchet wrench or any other suitable tool for rotating the shaft 36 with the tool on its inner end.

Boss 33 is provided on its outer periphery with an external screw-thread 60 on which is disposed a device for feeding the shaft 36 with the combined drill and tap downwardly. This device comprises a ring 61 provided with an internal screw-thread which is adapted to engage thread 60. A bail 64 is pivotally mounted at one end to rings 61 by means of pins 65 and at the other end is provided with a yoke adapted to engage a collar or shoulder 65 on shaft 36. Handles 63 are rigidly secured to ring 61 for manually rotating the ring so that when the shaft 36 is turned by means of a wrench, downward pressure may be applied to the shaft.

A shaft 51 extends through a hole 50 in cap 23 and boss 34. This shaft extends within the casing and is provided at its inner end with an internally threaded socket 52. An attaching bolt or sleeve, such as shown in the aforementioned application No. 530,628, filed by me, January 19, 1922, is loosely held in said socket. The outer end of shaft 51 is provided with a shoulder 54 which is adapted to engage a shoulder 55 on boss 34 to limit the outward movement of the shaft. A packing box around shaft 51 prevents leakage of water from the casing 9. The outer end of shaft 51 is suitably formed for connection to a wrench or other rotating tool, so that the shaft 51 with the attaching bolt therein may be rotated. A collar 58 may be secured on each of the shafts 51 and 36 to limit the inward movement thereof.

In use, when it is desired to secure a tap connection to a water main, an attaching bolt or sleeve is loosely secured in socket 52 of shaft 51 and a combined drill and tap inserted in the chuck on the end of shaft 36. Cap 23 is then brought into position to bring the combined drill and tap on the end of shaft 36 in line with the place to be drilled and then by manipulation and operation of the devices 26, the cap is rigidly secured to the top of the casing in fluid-tight connection. The casing 9 is then secured on the main by means of the chains 18 and fixed thereto by means of tightening nuts 21. The bail 64 may then be raised so that the yoke engages collar 65. Shaft 36 is then turned and by rotation of ring 61 sufficient pressure is exerted upon to drill and tap the main. After this, the devices 26 may be loosened sufficiently to permit cap 23 to be rotated 180° until the shaft 51 with the attaching bolt is in line with the drilled and tapped hole. The shaft 51 is then turned and the bolt inserted in the hole. By reversing the rotation of the shaft, the socket 52 may be withdrawn from the bolt. This operation may be performed until the desired number of attaching lugs have been secured in the main, and the tap connection secured thereto.

If a tap connection such as exemplified in the aforementioned Letters Patent No. 1,317,870, granted to me, October 7, 1919, is desired to be connected to a main, two attaching lugs may be secured in the main and the fitting bolted thereto. The valve in the fitting may then be open and the main drilled through the valve opening. As soon as a hole has been completely drilled therethrough, the drill may be removed through the fitting and the valve closed so that the water will not escape from the main. The necessary connections to the tap fitting may then be secured so as to complete the connection.

The invention exemplifies a device for drilling and tapping holes in water mains and securing attaching lugs therein so that tap connections may be secured to the main without permitting the escape of water or turning off the supply in the main.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a device of the character described, the combination of a casing consisting of a substantially cylindrical wall having open ends, means for securing one end of the casing against a water main, a head rotatably mounted on the other end of said casing and having an annular wall extending towards the main and disposed adjacent the casing wall, means mounted in the head and extending through the casing for drilling a hole in the main, means also mounted in the head for inserting a bolt in the hole, one of said walls being provided with an annular groove, and means mounted in the other wall and extending into said groove for shifting the head axially into fluid-tight engagement with the said other end of the casing.

2. In a device of the character described, the combination of a casing consisting of a substantially cylindrical wall having open ends, means for securing one end of the casing against a water main, a head rotatably mounted on the other end of said casing and having an annular wall extending towards the main and disposed adjacent the casing wall, means mounted in the head and extending through the casing for drilling a hole in the main, means also mounted in the head for inserting a bolt in the hole, one of said walls being provided with an annular groove, and means for shifting the head axially into fluid-tight engagement with the said other end of the casing comprising annular members rotatably mounted in the other wall and having pins eccentrically mounted thereon and extending into said groove, and means for rotating said members.

3. In a device of the character described, the combination of a casing consisting of a substantially cylindrical wall having open ends, means for securing one end of the casing against a water main, a head rotatably mounted on the other end of said casing and having an annular wall extending around a portion of the casing wall, means mounted in the head and extending through the casing for drilling a hole through the main, means also mounted in the head for inserting a bolt in the hole, the said portion of the casing wall being provided with an annular groove, and means for shifting the head axially into fluid-tight engagement with the said other end of the casing comprising annular members rotatably mounted in said annular wall and provided with pins eccentrically mounted thereon and extending into said groove, and handles connected to said members for rotating the latter.

Signed at Chicago, Illinois this 23rd day of July, 1924.

JOHN F. FANSELOW.